United States Patent
Bismuto et al.

(10) Patent No.: US 12,197,020 B2
(45) Date of Patent: Jan. 14, 2025

(54) PHOTONICS INTEGRATED CIRCUIT ARCHITECTURE

(71) Applicant: Apple Inc., Cupertino, CA (US)

(72) Inventors: Alfredo Bismuto, Sunnyvale, CA (US); Mark Arbore, Los Altos, CA (US); Jason Pelc, Sunnyvale, CA (US); Hooman Abediasl, Thousand Oaks, CA (US); Andrea Trita, Pasadena, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/079,672

(22) Filed: Dec. 12, 2022

(65) Prior Publication Data

US 2023/0107907 A1    Apr. 6, 2023

Related U.S. Application Data

(63) Continuation of application No. 16/582,838, filed on Sep. 25, 2019, now Pat. No. 11,525,967.

(Continued)

(51) Int. Cl.
   *G02B 6/42*      (2006.01)
   *G02B 6/00*      (2006.01)
   (Continued)

(52) U.S. Cl.
   CPC ....... *G02B 6/4215* (2013.01); *G02B 6/29301* (2013.01); *G02B 6/2938* (2013.01); *G02B 6/4206* (2013.01)

(58) Field of Classification Search
   CPC ............. G02B 6/4215; G02B 6/29301; G02B 6/2938; G02B 6/00
   (Continued)

(56) References Cited

U.S. PATENT DOCUMENTS

| 4,897,711 A | 1/1990 | Blonder |
|---|---|---|
| 5,037,779 A | 8/1991 | Whalley |

(Continued)

FOREIGN PATENT DOCUMENTS

| JP | H07297324 | 11/1995 |
|---|---|---|
| WO | WO 14/141451 | 9/2014 |

(Continued)

OTHER PUBLICATIONS

Bogaerts, et al., "Off-Chip Coupling," *Handbook of Silicon Photonics*, CRC Press, Apr. 2013, 43 pages.

(Continued)

*Primary Examiner* — Kaveh C Kianni
(74) *Attorney, Agent, or Firm* — Brownstein Hyatt Farber Schreck, LLP (57) ABSTRACT

This disclosure relates to the layout of optical components included in a photonics integrated circuit (PIC) and the routing of optical traces between the optical components. The optical components can include light sources, a detector array, and a combiner. The optical components can be located in different regions of a substrate of the PIC, where the regions may include one or more types of active optical components, but also may exclude other types of active optical components. The optical traces can include a first plurality of optical traces for routing signals between light sources and a detector array, where the first plurality of optical traces can be located in an outer region of the substrate. The optical traces can also include a second plurality of optical traces for routing signals between the light sources and a combiner, where the second plurality of optical traces can be located in regions between banks of the light sources.

14 Claims, 7 Drawing Sheets

Related U.S. Application Data (60) Provisional application No. 62/738,712, filed on Sep. 28, 2018.

(51) Int. Cl.
*G02B 6/02* (2006.01)
*G02B 6/293* (2006.01)

(58) Field of Classification Search
USPC .......................................................... 385/14
See application file for complete search history.

(56) References Cited

U.S. PATENT DOCUMENTS

| | | | |
|---|---|---|---|
| 5,109,455 A | 4/1992 | Niswonger | |
| 5,479,540 A | 12/1995 | Boudreau | |
| 5,488,678 A * | 1/1996 | Taneya | G02B 6/4232 |
| | | | 372/50.1 |
| 5,577,142 A | 11/1996 | Mueller-Fiedler et al. | |
| 5,604,160 A | 2/1997 | Warfield | |
| 5,981,945 A | 11/1999 | Spaeth | |
| 6,074,104 A | 6/2000 | Higashikawa | |
| 6,228,675 B1 | 5/2001 | Ruby | |
| 6,330,378 B1 * | 12/2001 | Forrest | H01S 5/0262 |
| | | | 372/50.21 |
| 6,367,988 B1 | 4/2002 | Auracher | |
| 6,393,185 B1 * | 5/2002 | Deacon | G02B 6/42 |
| | | | 385/12 |
| 6,461,059 B2 | 10/2002 | Ando et al. | |
| 6,465,929 B1 | 10/2002 | Levitan et al. | |
| 6,519,382 B1 | 2/2003 | Jurbergs | |
| 6,588,949 B1 | 7/2003 | Zhou | |
| 6,594,409 B2 * | 7/2003 | Dutt | G02B 6/12021 |
| | | | 385/88 |
| 6,628,858 B2 | 9/2003 | Zhang | |
| 6,632,027 B1 | 10/2003 | Yoshida | |
| 6,657,723 B2 * | 12/2003 | Cohen | G02B 6/4215 |
| | | | 385/14 |
| 6,759,668 B2 | 7/2004 | Matsuo et al. | |
| 6,767,753 B2 | 7/2004 | Huang | |
| 6,786,654 B2 | 9/2004 | Kilian | |
| 6,795,622 B2 | 9/2004 | Forrest | |
| 6,798,931 B2 | 9/2004 | Kathman et al. | |
| 6,801,679 B2 | 10/2004 | Koh | |
| 6,801,683 B2 | 10/2004 | Kanie et al. | |
| 6,821,032 B2 | 11/2004 | Lake et al. | |
| 6,823,098 B2 | 11/2004 | Guidotti et al. | |
| 6,856,717 B2 | 2/2005 | Kilian | |
| 6,873,763 B2 * | 3/2005 | Nikonov | H04J 14/02 |
| | | | 385/37 |
| 6,894,358 B2 | 5/2005 | Leib | |
| 6,898,222 B2 | 5/2005 | Hennig et al. | |
| 6,904,191 B2 | 6/2005 | Kubby | |
| 6,932,519 B2 | 8/2005 | Steinberg | |
| 6,935,792 B2 | 8/2005 | Saia et al. | |
| 6,940,182 B2 | 9/2005 | Hilton et al. | |
| 6,947,639 B2 * | 9/2005 | Singh | G02B 6/42 |
| | | | 385/37 |
| 6,952,504 B2 * | 10/2005 | Bi | H01S 3/0632 |
| | | | 385/9 |
| 6,955,481 B2 | 10/2005 | Colgan et al. | |
| 6,964,881 B2 | 11/2005 | Chua et al. | |
| 6,969,204 B2 | 11/2005 | Kilian | |
| 6,975,465 B1 | 12/2005 | Chung | |
| 7,054,517 B2 | 5/2006 | Mossberg | |
| 7,058,245 B2 * | 6/2006 | Farahi | G02B 6/1221 |
| | | | 372/39 |
| 7,062,114 B2 * | 6/2006 | Webjorn | H04J 14/0276 |
| | | | 385/14 |
| 7,071,521 B2 | 7/2006 | Leib et al. | |
| 7,079,715 B2 * | 7/2006 | Kish, Jr. | H04B 10/2914 |
| | | | 398/91 |
| 7,085,445 B2 | 8/2006 | Koh | |
| 7,165,896 B2 | 1/2007 | Hauffe et al. | |
| 7,203,401 B2 * | 4/2007 | Mossberg | G02B 6/124 |
| | | | 385/24 |
| 7,209,611 B2 | 4/2007 | Joyner | |
| 7,213,978 B2 | 5/2007 | Kuhmann | |
| 7,223,619 B2 | 5/2007 | Wang | |
| 7,245,379 B2 * | 7/2007 | Schwabe | G01N 21/6428 |
| | | | 356/337 |
| 7,283,694 B2 | 10/2007 | Welch | |
| 7,315,039 B2 | 1/2008 | Kitagawa | |
| 7,335,986 B1 | 2/2008 | Paek | |
| 7,358,109 B2 | 4/2008 | Gallup et al. | |
| 7,366,364 B2 * | 4/2008 | Singh | G02B 6/126 |
| | | | 385/11 |
| 7,426,347 B2 | 9/2008 | Hnatiw et al. | |
| 7,447,393 B2 * | 11/2008 | Yan | G02B 6/12026 |
| | | | 385/129 |
| 7,460,742 B2 * | 12/2008 | Joyner | G02B 6/12007 |
| | | | 385/24 |
| 7,477,384 B2 | 1/2009 | Schwabe | |
| 7,483,599 B2 * | 1/2009 | Kish, Jr. | G01R 31/31728 |
| | | | 372/20 |
| 7,519,246 B2 | 4/2009 | Welch et al. | |
| 7,576,333 B2 | 8/2009 | Modavis | |
| 7,577,327 B2 | 8/2009 | Blauvelt et al. | |
| 7,612,881 B2 | 11/2009 | Ban et al. | |
| 7,680,364 B2 | 3/2010 | Nilsson | |
| 7,720,328 B2 | 5/2010 | Yan | |
| 7,750,289 B2 | 7/2010 | Feldman | |
| 7,812,264 B2 | 10/2010 | Yoneda et al. | |
| 7,885,492 B2 | 2/2011 | Welch | |
| 7,974,504 B2 | 7/2011 | Nagarajan | |
| 8,105,514 B2 | 1/2012 | Hayashi | |
| 8,198,109 B2 | 6/2012 | Lerman et al. | |
| 8,318,057 B2 | 11/2012 | Harden | |
| 8,417,071 B2 | 4/2013 | Hopkins et al. | |
| 8,474,134 B2 | 7/2013 | Yoneda et al. | |
| 8,548,287 B2 | 10/2013 | Thacker et al. | |
| 8,563,358 B2 | 10/2013 | Landesberger et al. | |
| 8,611,388 B2 | 12/2013 | Krasulick et al. | |
| 8,638,485 B2 | 1/2014 | Feng et al. | |
| 8,659,813 B2 | 2/2014 | Davis et al. | |
| 8,735,191 B2 | 5/2014 | Marchena | |
| 8,774,569 B2 | 7/2014 | Dougherty et al. | |
| 8,859,394 B2 | 10/2014 | Dallesasse et al. | |
| 8,916,587 B1 | 12/2014 | King et al. | |
| 8,966,748 B2 | 3/2015 | Leib | |
| 9,008,139 B2 | 4/2015 | Monadgemi | |
| 9,031,412 B2 * | 5/2015 | Nagarajan | B82Y 20/00 |
| | | | 398/95 |
| 9,041,015 B2 | 5/2015 | Lai et al. | |
| 9,064,988 B2 | 6/2015 | Hsiao et al. | |
| 9,091,594 B2 | 7/2015 | Furstenberg et al. | |
| 9,310,248 B2 | 4/2016 | Karlsen et al. | |
| 9,395,494 B2 | 7/2016 | Krishnamurthi et al. | |
| 9,396,914 B2 | 7/2016 | Steiner | |
| 9,405,066 B2 | 8/2016 | Mahgerefteh | |
| 9,702,975 B2 | 7/2017 | Brinkmeyer | |
| 9,715,064 B1 | 7/2017 | Gambino et al. | |
| 9,874,701 B2 | 1/2018 | Baets et al. | |
| 9,880,352 B2 * | 1/2018 | Florjanczyk | G02B 6/1228 |
| 9,923,105 B2 | 3/2018 | Krasulick et al. | |
| 9,952,099 B2 | 4/2018 | Wijepans et al. | |
| 10,009,668 B2 | 6/2018 | Liboiron-Ladouceur | |
| 10,014,654 B2 | 7/2018 | Yim et al. | |
| 10,046,229 B2 | 8/2018 | Tran et al. | |
| 10,067,426 B2 | 9/2018 | Pandey | |
| 10,203,762 B2 | 2/2019 | Bradski et al. | |
| 10,268,043 B2 | 4/2019 | Zhou et al. | |
| 10,283,939 B2 | 5/2019 | Dawson et al. | |
| 10,295,740 B2 | 5/2019 | Bourstein et al. | |
| 10,310,196 B2 | 6/2019 | Hutchison | |
| 10,374,699 B2 | 8/2019 | Ji et al. | |
| 10,429,582 B1 | 10/2019 | Bian et al. | |
| 10,436,028 B2 | 10/2019 | Dai et al. | |
| 10,495,813 B2 | 12/2019 | Mahgerefteh et al. | |
| 10,511,146 B2 | 12/2019 | Lebby et al. | |
| 10,529,003 B2 | 1/2020 | Mazed | |
| 10,613,276 B2 | 4/2020 | Mansouri et al. | |
| 10,634,843 B2 | 4/2020 | Bayn et al. | |

(56) References Cited

U.S. PATENT DOCUMENTS

| | | | |
|---|---|---|---|
| 10,656,429 B2 | 5/2020 | Zhou et al. | |
| 10,823,912 B1 | 11/2020 | Pelc et al. | |
| 10,897,122 B2 | 1/2021 | Mathai et al. | |
| 10,985,524 B1 | 4/2021 | Bayn et al. | |
| 11,086,088 B2 | 8/2021 | Huebner et al. | |
| 11,181,688 B2 | 11/2021 | Krasulick et al. | |
| 11,320,718 B1 | 5/2022 | Mahmoud et al. | |
| 11,480,728 B2 | 10/2022 | Bayn et al. | |
| 11,482,513 B2 | 10/2022 | Krasulick et al. | |
| 11,500,139 B2 | 11/2022 | Zhou et al. | |
| 11,525,967 B1 | 12/2022 | Bismuto et al. | |
| 11,881,678 B1 | 1/2024 | Bishop et al. | |
| 2001/0041025 A1* | 11/2001 | Farahi | C08G 77/58 372/39 |
| 2002/0031711 A1 | 3/2002 | Steinberg et al. | |
| 2002/0110335 A1 | 8/2002 | Wagner et al. | |
| 2002/0154847 A1* | 10/2002 | Dutt | G02B 6/12021 385/14 |
| 2003/0002106 A1 | 1/2003 | Takahashi | |
| 2003/0007719 A1* | 1/2003 | Forrest | G02B 6/12004 385/14 |
| 2003/0095736 A1* | 5/2003 | Kish, Jr. | H01S 5/0265 385/37 |
| 2003/0095737 A1* | 5/2003 | Welch | H01S 5/0683 385/14 |
| 2003/0197862 A1* | 10/2003 | Cohen | G01J 3/0259 356/328 |
| 2004/0067006 A1* | 4/2004 | Welch | H01S 5/4031 385/14 |
| 2004/0208428 A1 | 10/2004 | Kikuchi et al. | |
| 2004/0213582 A1* | 10/2004 | Joyner | G02B 6/12007 398/183 |
| 2005/0018951 A1* | 1/2005 | Mossberg | G02B 6/42 385/14 |
| 2005/0068536 A1* | 3/2005 | Schwabe | B01L 3/502715 356/436 |
| 2005/0094926 A1* | 5/2005 | Dominic | G02B 6/12028 385/14 |
| 2005/0151094 A1 | 7/2005 | Kitagawa | |
| 2005/0205951 A1 | 9/2005 | Eskridge et al. | |
| 2006/0002443 A1* | 1/2006 | Farber | H01S 5/141 372/50.1 |
| 2006/0045144 A1 | 3/2006 | Karlsen et al. | |
| 2006/0045158 A1 | 3/2006 | Li | |
| 2006/0182445 A1 | 8/2006 | Lee et al. | |
| 2006/0193553 A1* | 8/2006 | Mossberg | G02B 6/42 385/37 |
| 2006/0279734 A1* | 12/2006 | Yan | G02B 6/12011 356/329 |
| 2007/0092177 A1* | 4/2007 | Nilsson | H04B 10/50 385/14 |
| 2007/0268489 A1* | 11/2007 | Schwabe | G01N 21/6428 356/337 |
| 2008/0044128 A1* | 2/2008 | Kish, Jr. | G02B 6/12033 385/14 |
| 2009/0087138 A1* | 4/2009 | Yan | G02B 6/12026 385/14 |
| 2009/0103580 A1 | 4/2009 | Farmer et al. | |
| 2009/0245719 A1* | 10/2009 | Nagarajan | G02B 6/12019 385/14 |
| 2010/0166424 A1* | 7/2010 | Nagarajan | H01S 5/0265 398/79 |
| 2011/0069731 A1 | 3/2011 | Gokay | |
| 2011/0158651 A1 | 6/2011 | Tang et al. | |
| 2014/0029943 A1* | 1/2014 | Mathai | H04Q 11/0005 398/49 |
| 2014/0160751 A1 | 6/2014 | Hogan et al. | |
| 2016/0091368 A1* | 3/2016 | Fish | H01S 5/4087 356/328 |
| 2016/0131837 A1* | 5/2016 | Mahgerefteh | G02B 6/124 385/14 |
| 2016/0156999 A1* | 6/2016 | Liboiron-Ladouceur | H04Q 11/0005 398/51 |
| 2016/0266331 A1* | 9/2016 | Hutchison | G02B 6/122 |
| 2017/0316487 A1* | 11/2017 | Mazed | G06Q 30/0241 |
| 2018/0113216 A1 | 4/2018 | Kremer et al. | |
| 2019/0004151 A1 | 1/2019 | Abediasl et al. | |
| 2019/0011639 A1 | 1/2019 | Abediasl et al. | |
| 2019/0204419 A1 | 7/2019 | Baba et al. | |
| 2019/0339468 A1* | 11/2019 | Evans | H04J 14/0297 |
| 2019/0342009 A1* | 11/2019 | Evans | G02B 6/4279 |
| 2019/0342010 A1* | 11/2019 | Evans | H04B 10/503 |
| 2020/0256956 A1 | 8/2020 | Luff et al. | |
| 2020/0343695 A1 | 10/2020 | Mathai et al. | |
| 2022/0021179 A1 | 1/2022 | Lee et al. | |
| 2022/0128666 A1 | 4/2022 | Schrans et al. | |
| 2022/0221649 A1 | 7/2022 | Sakamoto | |
| 2023/0011177 A1 | 1/2023 | Arbore | |
| 2023/0012376 A1 | 1/2023 | Arbore et al. | |
| 2023/0085761 A1 | 3/2023 | Witmer et al. | |
| 2023/0228945 A1 | 7/2023 | Shah et al. | |
| 2023/0277062 A1 | 9/2023 | Dalvi et al. | |
| 2023/0324286 A1 | 10/2023 | Pelc et al. | |
| 2024/0102856 A1 | 3/2024 | Terrel et al. | |

FOREIGN PATENT DOCUMENTS

| | | |
|---|---|---|
| WO | WO 19/152990 | 8/2019 |
| WO | WO 20/086744 | 4/2020 |
| WO | WO 20/106974 | 5/2020 |
| WO | WO 20/240796 | 12/2020 |
| WO | WO 21/116766 | 6/2021 |

OTHER PUBLICATIONS

Chang et al., "A Comb-Drive Actuator Driven by Capacitively-Coupled-Power," *Sensors*, 2012, pp. 10881-10889.

Dhoore et al., "Novel adiabatic tapered couplers for active III-V/SOI devices fabricated through transfer printing," Ghent University, Belgium, Optical Society of America, 2016, 16 pages.

He et al., "Integrated Polarization Compensator for WDM Waveguide Demultiplexers," *IEEE Photonics Technology Letters* vol. 11, No. 2, Feb. 1999, pp. 224-226.

Holmström et al., "MEMS Laser Scanners: A Review," *Journal of Microelectromechanical Systems*, vol. 23, No. 2, 2014, pp. 259-275.

Komljenovic et al., "Photonic Integrated Circuits Using Heterogeneous Integration on Silicon," Proceedings of the IEEE 2018, pp. 1-12.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Milanovic et al., "Compact MEMS Mirror Based Q-Switch Module for Pulse-on-demand Laser Range Finders," presented at SPIE Conference on MOEMS and Miniaturized Systems XIV, San Francisco, California, 2015, 7 pages.

Schiappelli et al., "Efficient fiber-to-waveguide coupling by a lens on the end of the optical fiber fabricated by focused ion beam milling," *Microelectronic Engineering*, 73-74, 2004, pp. 397-404.

Tsai et al., "A Laminate Cantilever Waveguide Optical Switch," 2012, downloaded Sep. 19, 2021 from IEEE Xplore, pp. 203-207.

Worhoff et al., "Flip-chip assembly for photonic circuits," MESA+ Research Institute, University of Twente, Integrated Optical MicroSystems Group, The Netherlands, 12 pages.

U.S. Appl. No. 17/750,082, filed May 20, 2022, Witmer et al..

U.S. Appl. No. 18/121,427, filed Mar. 14, 2023, Pelc et al..

Zhang et al. "Tri-wavelength blending method for speckle reduction and color space enhancement in laser projection systems" (2024) Displays 84 p. 102748.

\* cited by examiner

PHOTONICS INTEGRATED CIRCUIT ARCHITECTURE

CROSS REFERENCE TO RELATED APPLICATIONS

This application is a continuation of U.S. patent application Ser. No. 16/582,838, filed Sep. 25, 2019, which claims the benefit under 35 USC 119(e) of U.S. Patent Application No. 62/738,712, filed Sep. 28, 2018, entitled "Photonics Integrated Circuit (PIC) Architecture," the contents of which are herein incorporated by reference in their entirety for all purposes.

FIELD

This relates generally to an architecture for a plurality of optical components included in a photonics integrated circuit.

BACKGROUND

Devices can be useful for many applications, such as trace gas detection, environmental monitoring, biomedical diagnostics, telecommunications, and industrial process controls. Some applications may benefit from having a large spectral range with multiple integrated light sources that can stabilize with high precision. These applications may make use of a compact, portable electronic device, which may benefit from densely-packed optical components and a floorplan that reduces optical losses.

SUMMARY

This disclosure relates to the layout of a plurality of optical components included in a photonics integrated circuit (PIC) and the routing of optical traces between the plurality of optical components. The plurality of optical components can include a plurality of light sources, a detector array, and a combiner. The plurality of optical components can be located in different regions of a substrate of the PIC, where the regions may include one or more types of active optical components, but also may exclude other types of active optical components. The optical traces can include a first plurality of optical traces for routing signals between a plurality of light sources and a detector array, where the first plurality of optical traces can be located in an outer region of the substrate. The optical traces can also include a second plurality of optical traces for routing signals between the plurality of light sources and a combiner, where the second plurality of optical traces can be located in regions between banks of the plurality of light sources. Examples of the disclosure also include the PIC including a plurality of multi-taps for crossing signals on the first plurality of optical traces and signals on the second plurality of optical traces for matching and reduction of optical losses.

A photonics integrated chip may include: a plurality of active optical components integrated into a substrate of the photonics integrated chip, the plurality of active optical components including: a plurality of light sources located in a first region and a second region of the substrate, a detector array located in a third region of the substrate, and a combiner located in a fourth region of the substrate; a first plurality of optical traces for routing the plurality of light sources to the detector array, the first plurality of optical traces located in a fifth region of the substrate; and a second plurality of optical traces for routing the plurality of light sources to the combiner, the second plurality of optical traces located in a sixth region of the substrate. Additionally or alternatively, in some examples, the photonics integrated chip may further include: a plurality of light source banks, where the plurality of light sources is arranged as sets of light sources.

Additionally or alternatively, in some examples, the plurality of light source banks includes a first light source bank, the first light source bank including light sources that emit light having different wavelengths relative to the other light sources in the first light source bank. Additionally or alternatively, in some examples, the plurality of light source banks includes a plurality of photonics components, the plurality of photonics components: receiving and combining a plurality of signals from the plurality of light source banks; selecting from the combined plurality of signals, and outputting the selected signal along the second plurality of optical traces; and outputting non-selected signals along the first plurality of optical traces.

Additionally or alternatively, in some examples, the combiner: receives a plurality of signals from the plurality of photonics components along the second plurality of optical traces, and combines the received plurality of signals and outputs the combined signal. Additionally or alternatively, in some examples, each of the non-selected signals output from the same photonics component includes different wavelengths. Additionally or alternatively, in some examples, the non-selected signals are tapped portions of the fundamental modes of light from the combined plurality of signals. Additionally or alternatively, in some examples, the detector array includes a plurality of detectors, each detector receiving the non-selected signals and outputting detector signals, the photonics integrated chip may further include: a controller that receives the detector signals and monitors and determines a locked wavelength based on an intersection wavelength of the detector signals.

Additionally or alternatively, in some examples, the sixth region includes regions of the substrate between the plurality of light source banks. Additionally or alternatively, in some examples, the detector array includes a plurality of detectors, each detector connected to a set of the plurality of light sources, the set including light sources unique from other light sources included in other sets, each detector monitoring a locked wavelength of the set. Additionally or alternatively, in some examples, each of the plurality of light sources is a laser bar. Additionally or alternatively, in some examples, the first region, the second region, the third region, and the fourth region each exclude different respective types of active optical components. Additionally or alternatively, in some examples, the third region is located between the first region and the second region. Additionally or alternatively, in some examples, the fifth region includes an outside region of the substrate, the outside region located closer to edges of the substrate than the plurality of active optical components. Additionally or alternatively, in some examples, the photonics integrated chip may further include: a plurality of multi-taps connected to the plurality of light sources and the detector array, each multi-tap including a crossing to allow one of the first plurality of optical traces to cross one of the second plurality of routing traces.

A method for operating a device is disclosed. The method can include: generating light using one or more laser bars; combining the generated light using a plurality of photonics components; tapping first portions of the combined generated light using the plurality of photonics components; transmitting the tapped first portions along a first plurality of optical traces; combining and multiplexing second portions of the generated light using the plurality of photonics components; transmitting the combined and multiplexed second portions along a second plurality of optical traces; detecting the first portions of the generated light using a plurality of detectors; and combining the second portions using a combiner, where the one or more laser bars, the plurality of photonics components, the first plurality of optical traces, the second plurality of optical traces, the plurality of detectors, and the combiner are included in the same photonics integrated chip of the device.

Additionally or alternatively, in some examples, the method may further include: crossing the tapped first portions and the combined and multiplexed second portions using a plurality of multi-taps, the plurality of multi-taps included in the photonics integrated chip. Additionally or alternatively, in some examples, the transmission of the tapped first portions along the first plurality of optical traces includes transmitting signals along outer regions of the photonics integrated chip. Additionally or alternatively, in some examples, the transmission of the combined and multiplexed second portions along the second plurality of traces includes transmitting signals along regions between banks of the one or more laser bars. Additionally or alternatively, in some examples, the detection of the first portions of the generated light using the plurality of detectors includes: receiving a plurality of signals along the first plurality of optical traces; determining an intersection of wavelengths of the generated light in the plurality of signals; and determining a locked wavelength based on the intersection of wavelengths.

Also disclosed herein is a plurality of photonics components that can be multi-purpose components. The plurality of photonics components can combine and multiplex signals received from the plurality of light sources. The plurality of photonics components can also tap portions of the light generated from the plurality of light sources. The tapped portions can be detected by a plurality of light detectors included in the detector array. A controller can determine an intersection of the detected tapped portions and can determine and control a locked wavelength based on the intersection for frequency stabilization.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples. One or more components of the same type can be collectively referred to by a three-digit reference number (e.g., light source 202), where individual components of that type can be referred to by a three-digital reference number followed by a letter (e.g., light source 202A).

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

This disclosure relates to the layout of a plurality of optical components included in a photonics integrated circuit (PIC) and the routing of optical traces between the plurality of optical components. The plurality of optical components can include a plurality of light sources, a detector array, and a combiner. The plurality of optical components can be located in different regions of a substrate of the PIC, where the regions may include one or more types of active optical components, but also may exclude other types of active optical components. In some examples, the active optical components may include, but are not limited to lasers, detectors, variable optical attenuators, phase shifters, polarization controllers, optical amplifiers, and so forth. The optical traces can include a first plurality of optical traces for routing signals between the plurality of light sources and the detector array, where the first plurality of optical traces can be located in the outer region of the substrate. The optical traces can also include a second plurality of optical traces for routing signals between the plurality of light sources and the combiner, where the second plurality of optical traces can be located in regions between banks of the plurality of light sources. Examples of the disclosure also include the PIC including a plurality of multi-taps for crossing signals on the first plurality of optical traces and signals on the second plurality of optical traces for matching and reduction of optical losses.

Also disclosed herein is a plurality of photonics components that can be multi-purpose components. The plurality of photonics components can combine and multiplex signals received from the plurality of light sources. The plurality of photonics components can also tap portions of the light generated from the plurality of light sources. The tapped portions can be detected by a plurality of light detectors included in the detector array. A controller can determine an intersection of the detected tapped portions and can monitor and determine a locked wavelength and in some examples can determine an adjustment (which may be transmitted to the plurality of light sources), based on the intersection for frequency stabilization.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Overview of an Example Device

Figure 1:
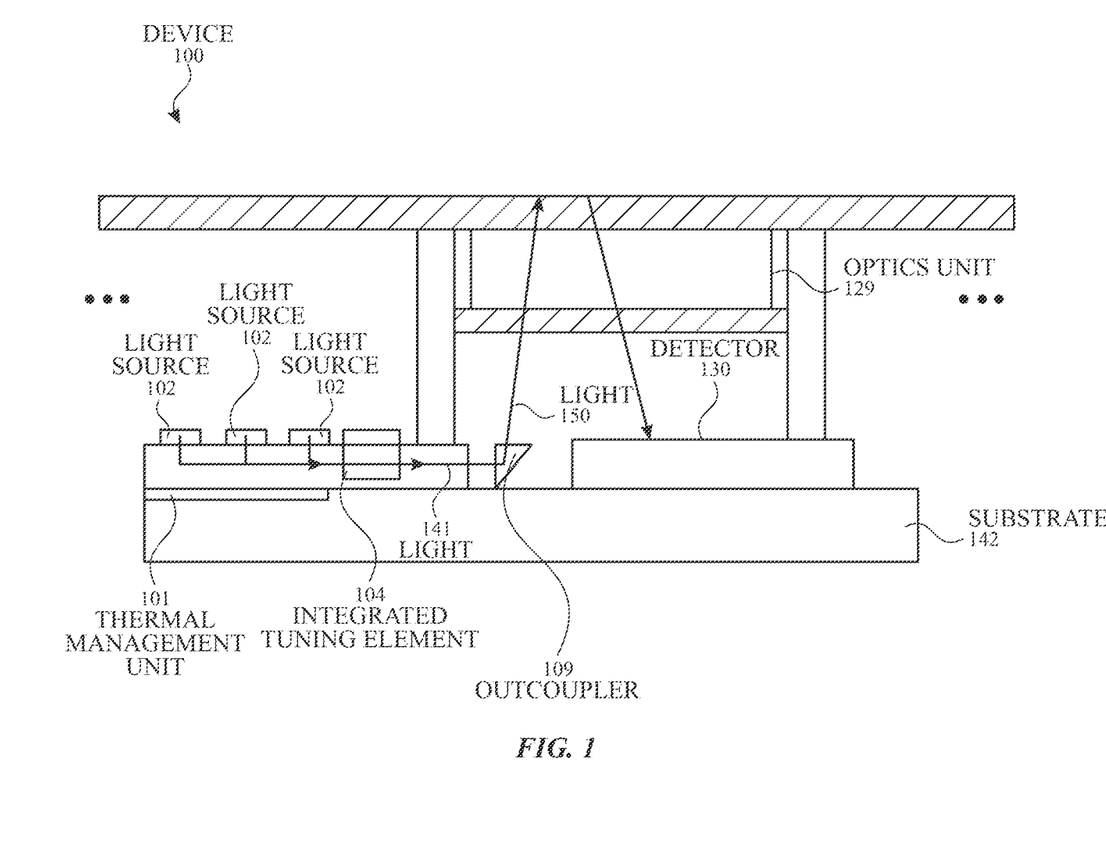
FIG. 1 illustrates a cross-sectional view of a portion of an example device.

FIG. 1 illustrates a cross-sectional view of a portion of an example device. The device 100 can include a plurality of components. The term "device" as used herein can refer to a single standalone component that can operate alone for a given function, or can refer to a system including multiple components that operate together to achieve the same functions. The device 100 can include optical components and/or active optical components such as a plurality of light sources 102, a detector 130, and an optics unit 129.

The light sources 102 can be configured to emit light 141. The light sources 102 can be any type of source capable of generating light including, but not limited to, a laser, a light emitting diode (LED), an organic light emitting diode (OLED), an electroluminescent (EL) source, a quantum dot (QD) light source, a super-luminescent diode, a super-continuum source, a fiber-based source, or any combination of one or more of these sources, and so forth. In some examples, one or more light sources 102 can be capable of emitting a plurality of wavelengths (e.g., a range of wavelengths) of light. In some examples, one or more of the light sources 102 can emit a different wavelength range of light (e.g., different colors in the spectrum) than the other light sources 102.

Light from the light sources 102 can be combined using one or more integrated tuning elements 104, optical traces (not shown), one or more multiplexers (not shown), and/or other optical components and/or active optical components. In some examples, the integrated tuning elements 104, the optical traces, and the multiplexer(s) can be disposed on a substrate 142. The substrate 142 can be included in a single optical platform, such as an integrated silicon photonics chip. An integrated silicon photonics chip can also be known as a photonics integrated chip (PIC). The device 100 can also include a thermal management unit 101 for controlling (e.g., heating or cooling, including stabilization) the temperature of the light sources 102. In some examples, the thermal management unit 101 may be co-packaged with the substrate 142. One or more outcouplers 109 can be coupled to the integrated tuning elements 104, optical traces, and/or multiplexers. The outcouplers 109 can be configured to focus, collect, collimate, and/or condition (e.g., shape) an incident light beam to form light 150, which can be directed towards the system interface (e.g., the external housing of the device 100).

Light can be light emitted from the light sources 102, collimated by the outcouplers 109, and in some examples, transmitted through the optics unit 129 (not illustrated in FIG. 1). At least a portion of light 150 can return to the device 100. The return light can be transmitted through the optics unit 129 and can be incident on the detector 130. In some examples, the return light may transmit through different optical components which may be included in the optics unit 129, than light 150 due to the different optical paths of the return light and the light 150.

Some applications may benefit from having a large spectral range with multiple integrated light sources that can stabilize with high precision. These applications may make use of a compact, portable electronic device, which may benefit from densely-packed optical components and a floorplan that reduces optical losses.

Example Floorplan

Figure 2A:
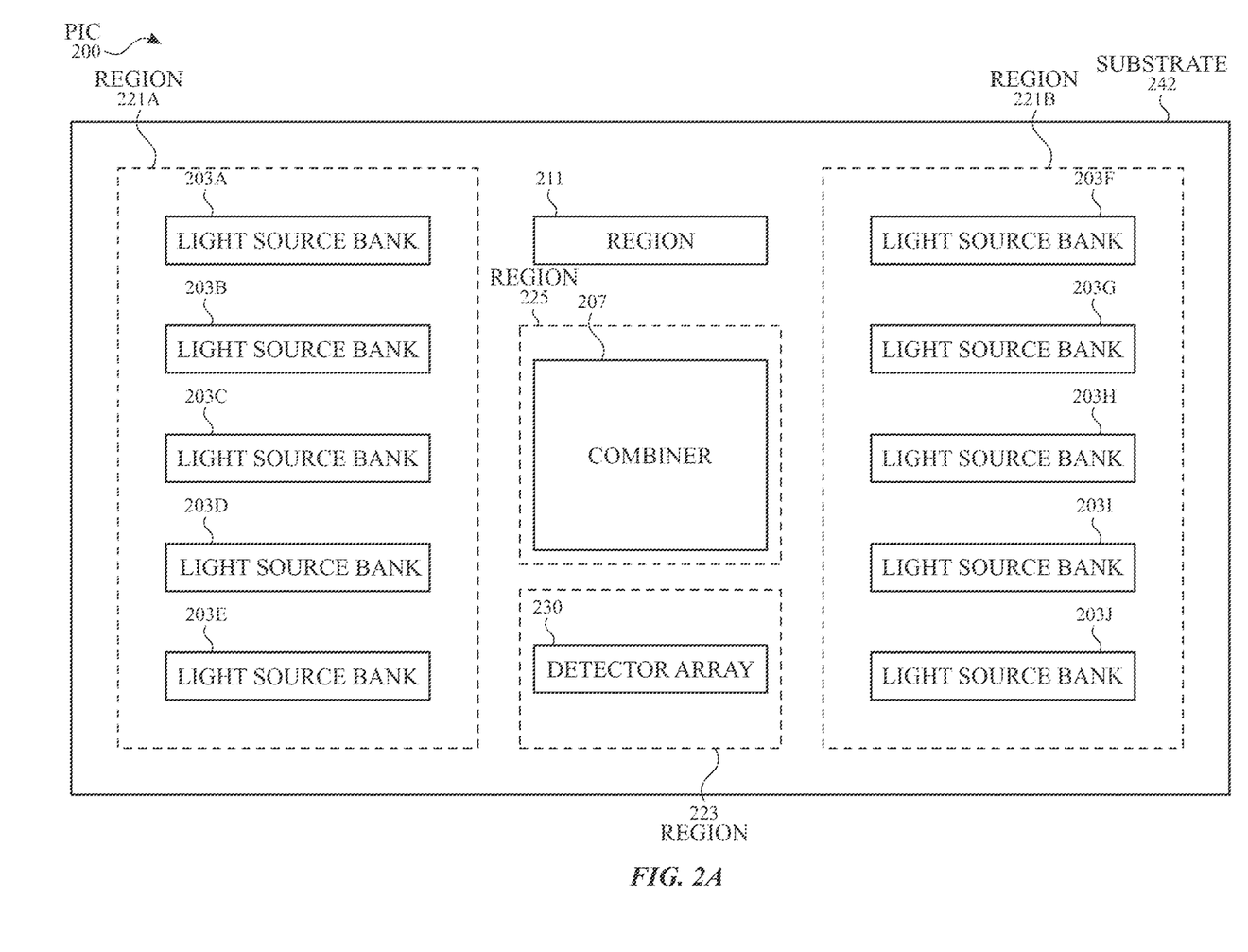
FIG. 2A illustrates a floorplan of optical components of an example PIC architecture.

FIG. 2A illustrates a floorplan of optical components of an example PIC architecture. The PIC 200 can include a plurality of light source banks 203, a detector array 230, and a combiner 207 located on a substrate 242. The plurality of light source banks 203 can be located in multiple regions of the device. For example, the light source banks 203A-203E can be located in a first region 221A, such as the left region, of the PIC 200. The light source banks 203F-203J can be located in a second region 221B, such as the right region of the PIC 200. The detector array 230 can be located in a third region 223, such as the central region of the PIC 200 between the light source banks 203A-203E and the light source banks 203F-203J. In some examples, the detector array 230 can be located at the bottom region of the PIC 200. The combiner 207 can also be located between the light source banks 203A-203E and the light source banks 203F-203J. The combiner 207 can be located in a fourth region 225 above region 223 (which may include the detector array 230), for example. In some examples, the PIC 200 may also include a region 211 for other components or for other purposes including but not limited to, radiation and or electronically controlled optical amplitude, phase and polarization, or any combination thereof, and so forth.

In some examples, the light source banks 203, the detector array 230, and the combiner 207 may be limited to being located in their respective regions, where one or more types of active optical components may be included in a region, while other active optical components may not be included in the same region. In this manner, all of the detectors, for example, may be located in a common region. An "active optical component" refers to an optical component that changes the properties of light using an electrical means. For example, a light source, a detector, and a combiner are active optical components, whereas optical routing traces may not be active optical components.

Examples of the disclosure can include a floorplan where regions are respectively arranged differently from the floorplan illustrated in the figure. For example, the light source banks 203 can all be located on one side (e.g., the left side, the right side, etc.), and the combiner 207 can be located on the other side from the light source banks 203. As another example, the light source banks 203A-203E can be located on top, and the detector array 230 can be located in the left region. The components can be placed such that optical losses from the light source banks 203 to the emission regions are minimized and matched, and optical losses from the light source banks 203 to the detectors in the detector array 230 are minimized and matched. In some examples, the PIC 200 may include one or more emission regions where light may exit the PIC 200 perpendicular to the PIC substrate or in-plane from the edge of the PIC substrate. For example, a fiber optic array may be coupled to the output of combiner 207, which may be an emission region. In some examples, reducing optical losses may be achieved via the placement and configuration of the optical routing traces, as discussed below.

Figure 2B:
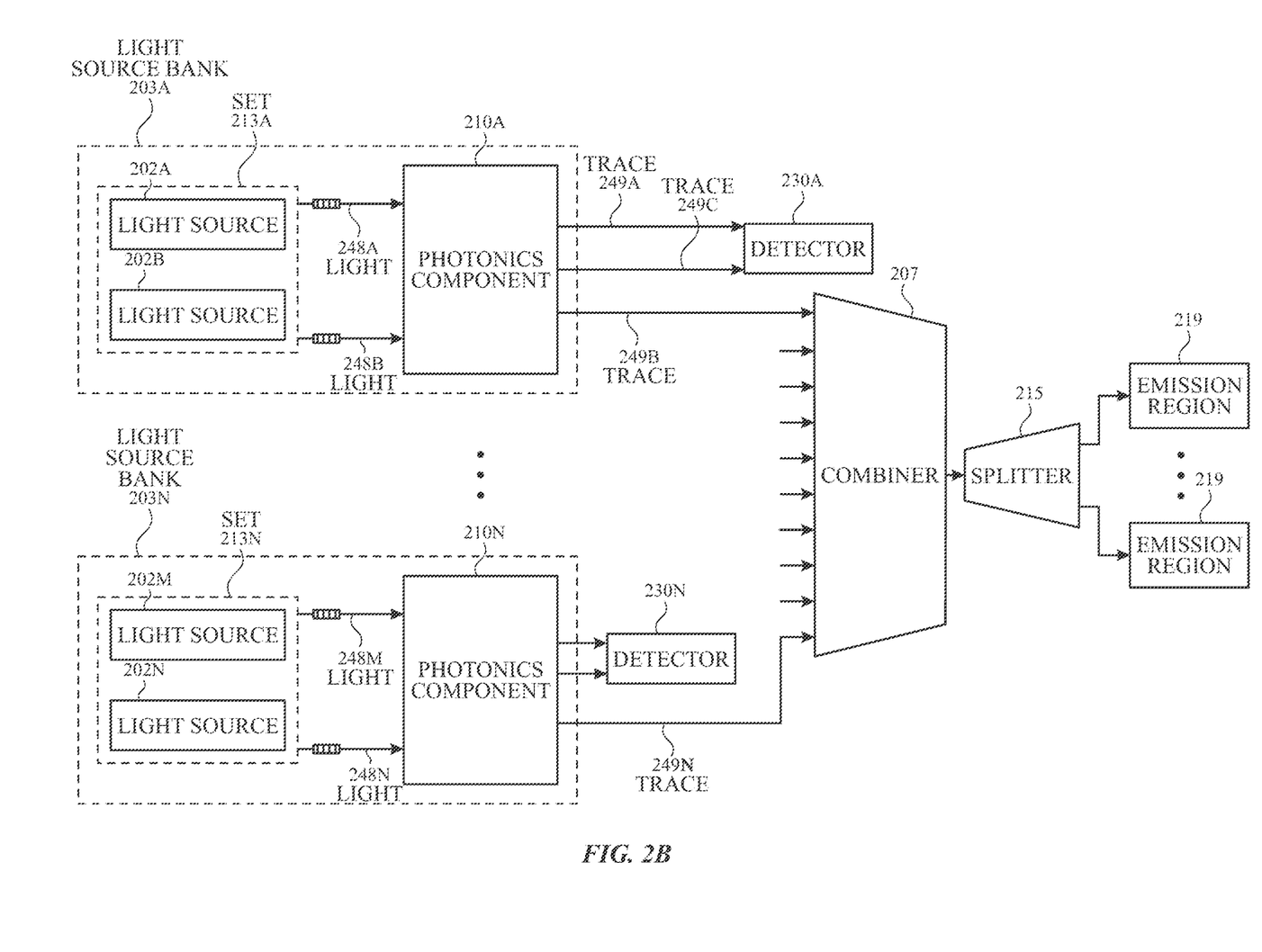
FIG. 2B illustrates a block diagram of a portion of an example PIC architecture included in a device.

FIG. 2B illustrates a block diagram of a portion of an example PIC architecture included in a device. The PIC 200 can include a plurality of light source banks 203, which can include a plurality of light sources 202. For example, the light source bank 203A can include the light source 202A and the light source 202B, and the light source bank 203N can include the light source 202M and the light source 202N. A light source 202 can include a laser bar, for example. In some instances, a light source 202 can generate light having multiple wavelengths. The plurality of light sources 202 can be associated with different sets 213 of light sources 202. For example, the light source 202A and the light source 202B can be associated with the set 213A, and the light source 202M and the light source 202N can be associated with the set 213N. The light sources 202 in a given set 213 may emit light 248 having different wavelengths relative to the light emitted by the other light sources in the same set, for example.

A light source bank 203 can also include a photonics component 210 that can facilitate in the measurement of the optical properties of light 248 to ensure that the light sources 202 are tuned to a targeted wavelength range and/or have a certain amount of wavelength stability (e.g., frequency stability). In some systems, the photonics component 210 can be a multi-purpose component that serves as a multiplexer for combining the signals from the plurality of light sources into a single output signal, in addition to frequency stability.

As discussed in more detail herein, each light source bank 203 can have a photonics component 210 unique from the other light source banks 203. A photonics component 210 can be connected to the plurality of light sources 202 within its respective light source bank 203. A photonics component 210 can also be connected to a detector 230 and a combiner 207. A photonics component 210 can generate a plurality (e.g., three) of output signals. Some (e.g., two) of the output signals can be transmitted along traces 249A and 249C to be input signals into a corresponding detector (e.g., detector 230A). The other output signal(s) can be transmitted along trace(s) 249B to be input signals into a combiner 207. Although for discussion purposes and with respect to FIG. 2B, three signals may be output from the photonics component 210, more or fewer signals may be output from the photonics component 210. The detector can receive the signals along traces 249A and 249C such that the detector 230 can be a channel monitor for wavelength locking. The operation of the detectors included in the detector array 230 is discussed in more detail herein.

The combiner 207 can receive a plurality of signals along traces 249B from the plurality of light source banks 203. The combiner 207 can combine the input signals and can generate an output signal to a splitter 215. The splitter 215 can receive the combined signal from the combiner 207 and split the combined signal into a plurality of signals. In some examples, the splitter 215 can be a broadband splitter, such as (but not limited to) an interleaved Y-junction splitter. The device can include a plurality of emission regions 219 that can receive signals output from the splitter 215. The emission regions 219 can refer to locations or components where light may exit the PIC 200. For example, the emission regions 219 can include a plurality of outcouplers.

As discussed herein, the combination of the photonics component 210 and the combiner 207 can result in a two-stage combiner that allows for optimization of the wavelength locking in addition to reducing optical losses.

Example Broadband Combiner

The combiner 207 can be an optical multiplexer, such as (but not limited to) an arrayed waveguide grating (AWG). In some examples, the combiner 207 can be a broadband combiner that may receive light having a wide range of frequencies and/or wavelengths. In some examples, the number of inputs to the combiner 207 can be equal to the number of associated light sources 202 multiplied by the number of photonics components 210.

In some instances, the combiner 207 can be used to combine the plurality of input signals into a fewer number of output signals. The combiner 207 can, additionally or alternatively, output signals from one light source bank 203 at a given time such as, e.g., per measurement period. In some examples, the combiner 207 can have one or more components and/or one or more functions similar to the photonics component 210 and the detector 230. For example, the combiner 207 may be used for frequency stability. In some examples, the combiner 207 may also be used for monitoring the power of the PIC 200 by, e.g., monitoring the sum of the intensity of its input signals.

Example Detector Array

The detector array 230 can include a plurality of detectors, such as detector 230A, detector 230N, etc. At least some, and in some examples all, of the detectors included in the detector array 230 can be located in a single region of the PIC 200, as shown in FIG. 2A. By locating the detectors in a single region, the size (e.g., footprint) of the PIC 200 can be reduced. Additionally, having a common place for all the detectors can facilitate in matching the optical losses.

The detectors can receive signals transmitted along traces 249A and 249C from the photonics components 210 included in the same light source bank 203. In some examples, the signals transmitted along the traces 249A and 249C can be tapped portions of the fundamental modes of the light combined by the photonics component 210. The signal from the trace 249A can include a first range of wavelengths, and the signal from the trace 249C can include a second range of wavelengths, for example. The first range of wavelengths and the second range of wavelengths may be different, at least in part.

A controller (not illustrated in FIG. 2B) can receive the signals from each detector associated with the same photonics components 210. The controller can take the ratio of the signals, which can be used to determine an intersection of the signals. The intersection can be located at the locked wavelength. The ratio can be also be used to control any chirping that may occur with the light sources 202. The signals may also be used for obtaining more signal parameters. For example, the absorption can be determined by taking the derivative of the two signals.

In some instances, each detector 230 can receive a unique output from the photonics component 210, thereby allowing dedicated channel monitoring. Dedicated channel monitoring can allow the device the ability to control the frequency as well as the intensity of the light emitted from the emission region(s).

Example Photonics Component

Figure 3:
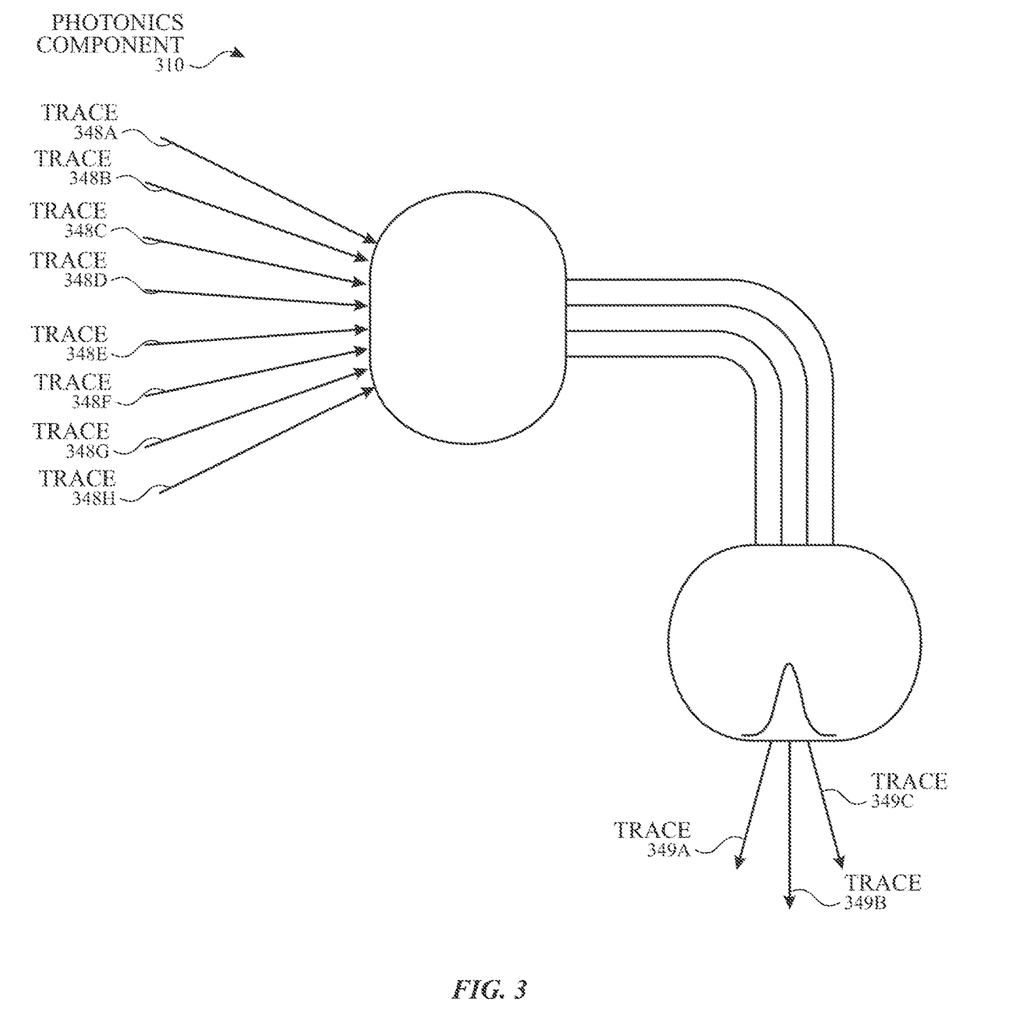
FIG. 3 illustrates a block diagram of an example photonics component.

The photonics component can be a multi-purpose component that can be used for, at least, frequency stabilization and multiplexing. FIG. 3 illustrates a block diagram of an example photonics component. The photonics component 310 can include one or more passive photonics components such as a filter, resonator, multiplexer, an arrayed waveguide grating (AWG), Mach-Zehnder interferometer (MZI), a Fabry-Perot cavity, a nanobeam cavity, a ring resonator, a Distributed Bragg Reflector (DBR), or the like for combining, selecting, and/or filtering input light.

The photonics component 310 can include an input section, for example, that receives and combines signals received along a plurality of traces 348 from a plurality of light sources (e.g., light sources 202 illustrated in FIG. 2B).

The input section can output the combined signals into a plurality of waveguides to an output section, which can generate at least three signals to be output along traces 349. One signal (along trace 349B) can be the result from a multiplexing function of the photonics component 310 and can be output to a combiner (e.g., combiner 207 illustrated in FIGS. 2A-2B). The other signals (along traces 349A and 349C) can be tapped portions of the fundamental mode of the combined light. The signal output along trace 349A can include a first range of wavelengths, and the signal output along trace 349C can include a second range of wavelengths. The trace 349A and the trace 349C can be connected to a detector array (e.g., detector array 230 illustrated in FIGS. 2A-2B), and signals can be output to the detector array accordingly.

By using a single component that performs multiple functions, the size, cost, and complexity of the PIC can be decreased. Although the figure illustrates a block diagram similar to an AWG, examples of the disclosure can include any other type of passive photonic component. Additionally or alternatively, the photonics component 310 can include one or more additional components not illustrated in the figures.

Example Optical Routing

Figure 4A:
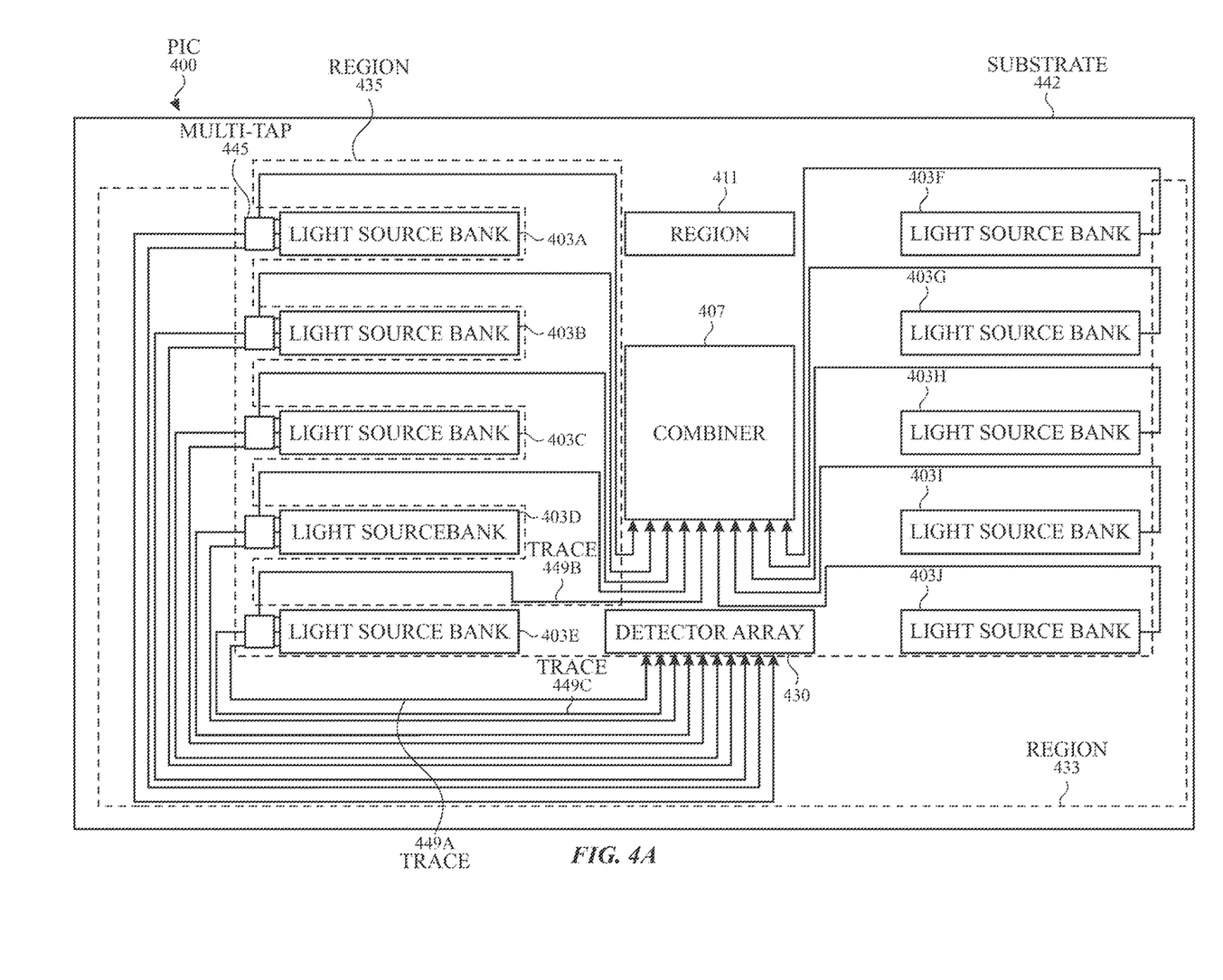
FIG. 4A illustrates a floorplan of optical components and optical traces of an example PIC.

FIG. 4A illustrates a floorplan of optical components and optical traces of an example PIC architecture. The PIC 400 can include a plurality of light source banks 403, a detector array 430, a combiner 407, and a region 411 that can have correspondingly similar functions and components as the plurality of light source banks 203, the detector array 230, the combiner 207, and the region 211 discussed herein and in FIGS. 2A and 2B.

The signals from the plurality of light source banks 403 can be routed to the combiner 407 and to the detector array 430 using one or more configurations to minimize optical losses. The amount of optical loss in transmitting signals from one component to another can depend on the number of bends in the routing traces and propagation loss along the total length of the optical traces. In general, a greater number of bends can lead to a greater amount of optical loss. In addition to reducing the optical loss, the optical routing can be such that the amount of space occupied by the components and the routing traces along the substrate can be minimized.

The traces from the light source bank 403 can be output to a multi-tap 445. The details of multi-tap 445 are discussed herein. Although FIG. 4A illustrates the multi-tap 445 and corresponding routing on the left side, examples of the disclosure further include additional multi-taps and corresponding routing on the right side (and are merely excluded for purposes of simplicity). The multi-tap 445 can route a plurality (e.g., two) of the traces, such as trace 449A and trace 449C, to the other side from where its inputs are received. For example, the traces can be received from the left of the light source banks 403A-403E (located on the left side), or right of the light source banks 403F-403J (located on the right side). The optical traces 449A and 449B can then be routed towards the detector array 430.

In the PIC 400 shown in the figure, the detector array 430 can be located at the bottom region of the PIC 400, so the optical traces can be routed down the sides of the substrate 442 and then towards the inside of region 433 at the bottom of the PIC 200. The region 433 can be a fifth region of the substrate 442. The region 433 for the optical traces can be located around the outside (e.g., closer to the edge of the PIC 400 than the other components, such as the detector array 430 and the light source banks 403) portions of the PIC 400.

The multi-tap 445 can route another trace, such as trace 449B, to a second side of the multi-tap 445. The second side can be a side opposite from that of which the trace 449A and trace 449C are output. Since FIG. 4A illustrates an example floorplan which shows the traces 449A and 449C as being routed down, the multi-tap 445 can route the trace 449B up. The trace 449B can then be routed towards the combiner 407 in a sixth region of the PIC 400. The sixth region can be a region located between the light source banks 403 and a region between the plurality of light source banks 403 and the combiner 407, illustrated as region 435 in the figure. The combiner 407 can be located in a center (e.g., surrounded by components) region of the PIC 400.

In this manner, the optical traces between the plurality of light source banks 403 and the combiner 407 can be routed between the light source banks 403, thereby creating boundaries between adjacent light source banks 403. Additionally, the optical traces between the plurality of light source banks 403 and the detector array 430 can be routed in the outer region 433 of the PIC 400.

Figure 4B:
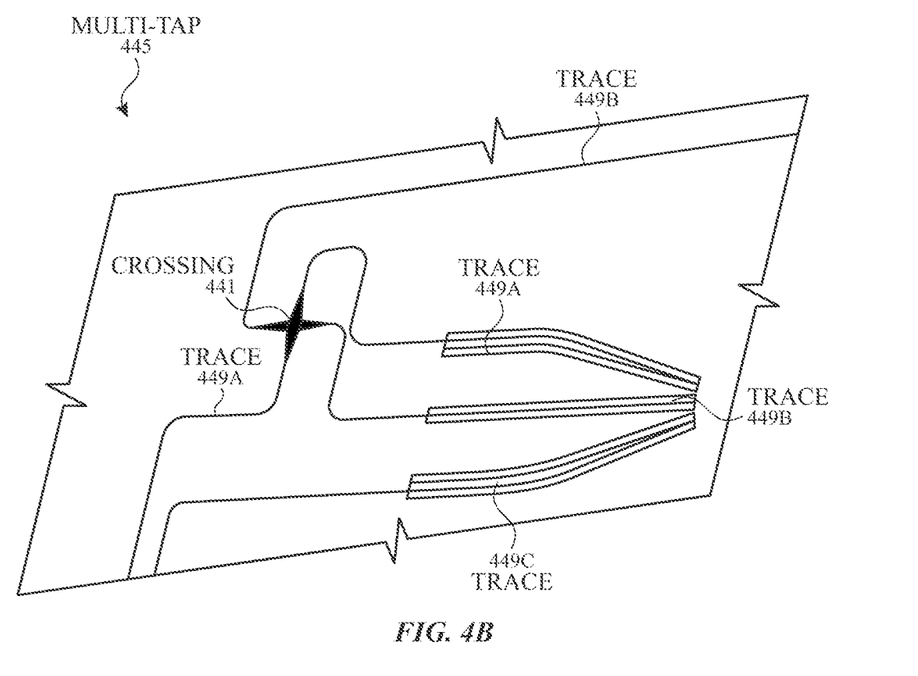
FIG. 4B illustrates a top view of an example multi-tap component.

FIG. 4B illustrates a top view of an example multi-tap component. Multi-tap 445 can receive a plurality of input signals from trace 449A, trace 449B, and trace 449C. The trace 449A can be located on top of the trace 449B when received as input into the multi-tap 445. The multi-tap 445 can include a crossing 441, where a first optical trace, such as the trace 449A, can cross (e.g., intersect) a second optical trace, such as trace 449B. Before the crossing 441, the traces 449A and 449B can change in one or more properties, such as its width. The traces 449A and 449B can have an increase in width that starts before the crossing 441, and then a decrease in width that starts at the crossing 441. That is, the traces 449A and 449B can be tapered. The traces may also have portions before and after the crossing 441 which are straight. The straight portions can be located between the bends and the beginning point of any change in width.

After the crossing 441, the trace 449A can be routed below the multi-tap 445 along with trace 449C. Additionally, after the crossing 441, the trace 449B can be routed above the crossing 441.

FIG. 4B illustrates the configuration of a multi-tap 445 for light source banks located on the left side of the substrate. For example, the multi-tap 445 illustrated in FIG. 4B can be connected to light source bank 403A with input signals received on the right side of the crossing 441 and output signals transmitted on the left side of the crossing 441. Examples of the disclosure can include a multi-tap 445 that has a mirrored configuration for light source banks located on the right side of the substrate. For example, light source banks 403F-403J can be connected to multi-taps 445 having the mirrored configuration. With the mirrored configuration (not shown), the input signals from the light source banks can be received on the left side of the crossing, and output signals can be transmitted on the right side of the crossing.

Example Device Operation

Figure 5:
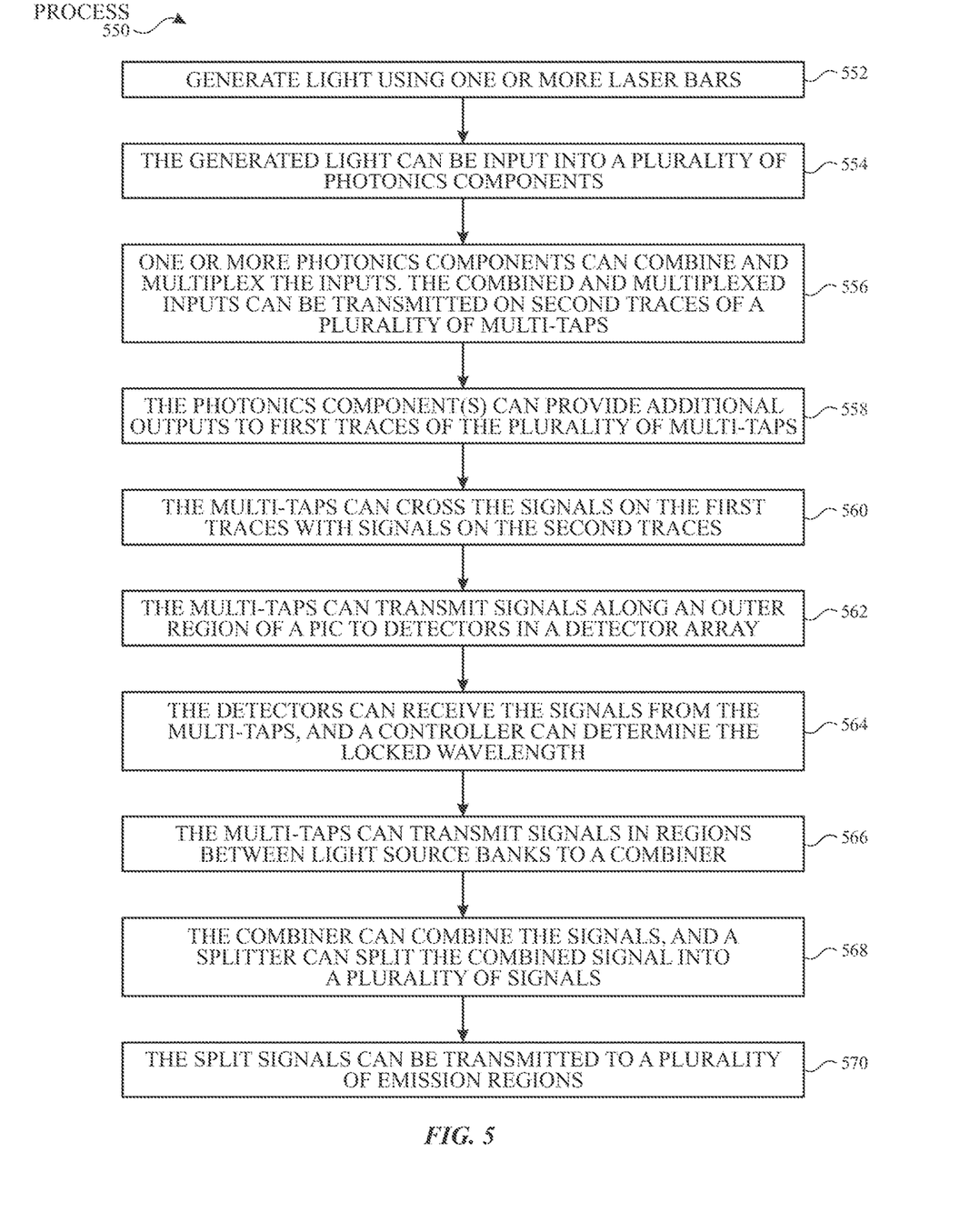
FIG. 5 illustrates an example operation of a device including a PIC.

FIG. 5 illustrates an exemplary operation of a device including a PIC. Process 550 begins by generating light using one or more laser bars (e.g., light source 202A, light source 202B illustrated in FIG. 2B) (step 552 of process 550). The generated light (e.g., light 248A, light 248B illustrated in FIG. 2B) can be input to a plurality of photonics components (e.g., photonics component 210A illustrated in FIG. 2B) (step 554 of process 550). One or more of the photonics components can combine and multiplex the inputs, outputting the signals on the second traces (e.g., trace 349B illustrated in FIG. 3, trace 449B illustrated in FIG. 4B)

of a plurality of multi-taps (e.g., multi-tap 445 illustrated in FIG. 4B) (step 556 of process 550).

The photonics component(s) may also provide additional outputs to first traces (e.g., trace 449A and trace 449C illustrated in FIG. 4B) of the plurality of multi-taps (step 558 of process 550). The multi-taps can cross the signals on the first traces with the signals on the second traces at crossings (e.g., crossing 441 illustrated in FIG. 4B) (step 560 of process 550). The multi-taps can transmit signals along an outer region of a PIC (e.g., region 433 illustrated in FIG. 4A) to detectors in a detector array (e.g., detector array 430 illustrated in FIG. 4A) (step 562 of process 550). The detectors can receive the signals, and a controller can determine the locked wavelength for frequency stabilization (step 564 of process 550).

The multi-taps can also transmit signals in regions between light source banks (e.g., region 435 illustrated in FIG. 4A) to a combiner (e.g., combiner 207 illustrated in FIG. 2B, combiner 407 illustrated in FIG. 4A) (step 566 of process 550). The combiner can combine the signals, and a splitter (e.g., splitter 215 illustrated in FIG. 2B) can split the combined signal into a plurality of signals (step 568 of process 550). The split signals can be transmitted to a plurality of emission regions (e.g., emission regions 219 of FIG. 2B) (step 570 of process 550).

In some examples, the light generated in step 552 and detected in step 562 can occur at certain regions of the PIC such as region 221A and region 223, respectively.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A photonics integrated chip comprising:
    a plurality of light source banks;
    a combiner; and
    a detector array; wherein:
    each light source bank of the plurality of light source banks comprises:
        a set of light sources;
        a first optical trace connected to the combiner;
        a second optical trace connected to the detector array; and
        a crossing at which the first trace of the light source bank crosses the second trace.

2. The photonics integrated chip of claim 1, wherein:
    the combiner combines inputs received from the first optical traces of the plurality of light source banks and outputs a combined signal.

3. The photonics integrated chip of claim 2, comprising a splitter positioned to receive the combined signal and configured to split the combined signal into a plurality of signals.

4. The photonics integrated chip of claim 3, comprising a plurality of emission regions from which the plurality of signals exit the photonic integrated chip.

5. The photonics integrated chip of claim 4, wherein:
    the plurality of emission regions comprises a plurality of outcouplers.

6. The photonics integrated chip of claim 4, comprising:
    a controller that receives detector signals from the detector array and monitors and controls a frequency of light emitted the plurality of emission regions.

7. The photonics integrated chip of claim 1, wherein:
    each light source bank of the plurality of light source banks comprises a third optical trace connected to the detector array.

8. The photonics integrated chip of claim 7, wherein:
    each light source bank of the plurality of light source banks comprises a photonic component that is configured to receive signals from the set of light sources and to output a corresponding signal output to each of the first, second, and third trace of the light source bank.

9. The photonics integrated chip of claim 8, wherein:
    the photonic component is an arrayed waveguide grating.

10. A photonics integrated chip comprising:
    a plurality of light source banks;
    a combiner; and
    a detector array; wherein:
    each light source bank of the plurality of light source banks comprises:
        a plurality of light sources;
        a first optical trace connected to the combiner;
        a second optical trace connected to the detector array; and
        a multiplexer that connects the plurality of light sources to each of the first optical trace and the second optical trace.

11. The photonics integrated chip of claim 10, wherein:
    the combiner combines inputs received from the first optical traces of the plurality of light source banks and outputs a combined signal.

12. The photonics integrated chip of claim 11, comprising a splitter positioned to receive the combined signal and configured to split the combined signal into a plurality of signals.

13. The photonics integrated chip of claim 12, comprising a plurality of emission regions from which the plurality of signals exit the photonic integrated chip.

14. The photonics integrated chip of claim 13, wherein:
    the plurality of emission regions comprises a plurality of outcouplers.

* * * * *